July 29, 1952     J. A. MASLIN     2,604,995
FILTERING APPARATUS
Filed July 21, 1949
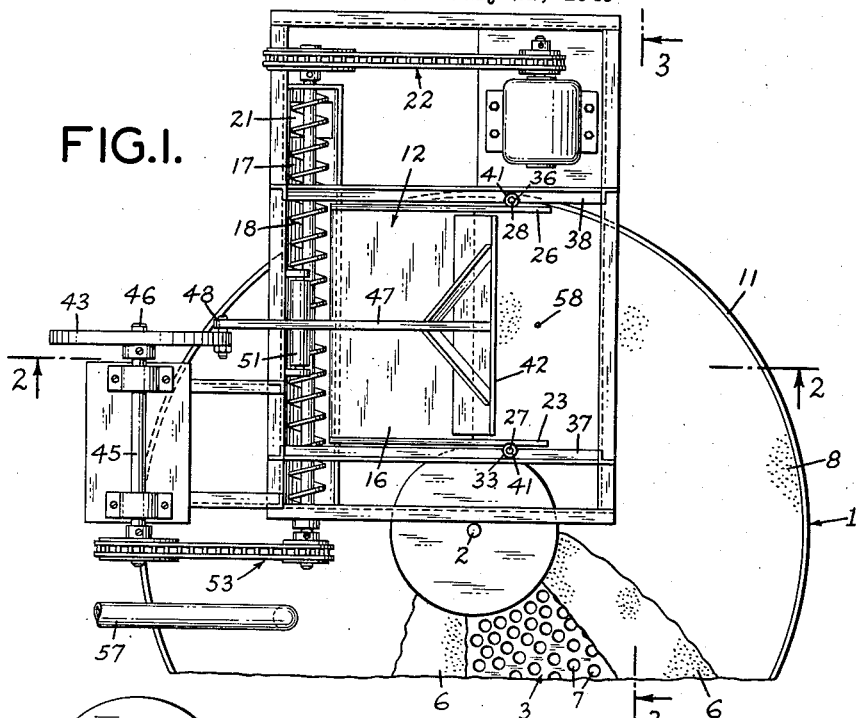
FIG.1.
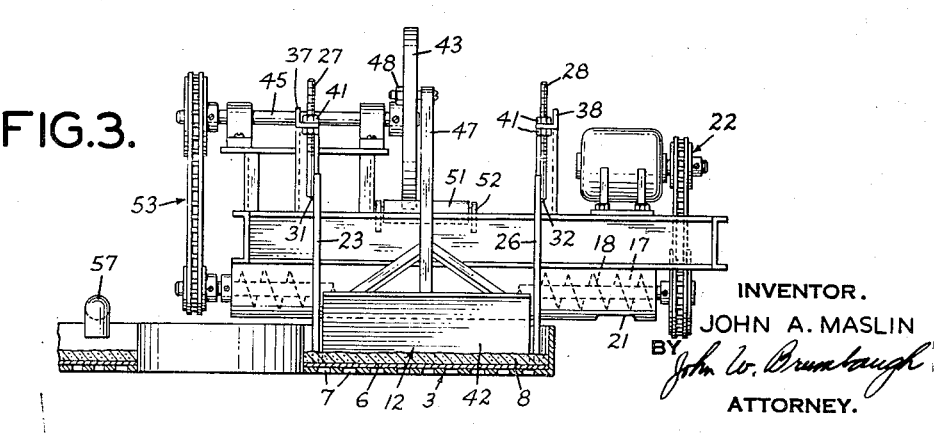
FIG.2.
FIG.3.
INVENTOR.
JOHN A. MASLIN
BY John W. Brumbaugh
ATTORNEY.

Patented July 29, 1952

2,604,995

UNITED STATES PATENT OFFICE 2,604,995

FILTERING APPARATUS

John A. Maslin, Claymont, Del., assignor to Allied Chemical & Dye Corporation, New York, N. Y., a corporation of New York Application July 21, 1949, Serial No. 106,018

2 Claims. (Cl. 210—202.5)

This invention relates to means for lifting and removing comminuted solid or semi-solid material from a horizontal surface, specifically to apparatus for discharging such material from a horizontal rotating table filter.

Horizontal table filters are commonly used in industry for filtering liquors and slurries to recover solid or semi-solid material therefrom. Usual apparatus comprises a horizontal circular table rotating about a vertical axis. The table may have a circumferential upstanding rim to confine the slurry and solid and prevent the same from spilling over the table edge. However, when removing the filtered solids from the table, certain problems arise depending upon consistency and other characteristics of the solids. For example, after filtration certain solids may possess properties approaching those of a thixotrope, i. e. become converted to a thin flowable mud or substantially a liquid when worked mechanically to any appreciable extent. Conventional types of table filter discharge apparatus, e. g. a screw conveyor with a scroll back-up plate are intended to scrape filtered solids from the table in a radial direction, and press said solids against the inside of the upstanding rim and thence over the top edge of the rim into suitable collecting receivers. Such conventional discharge apparatus, when applied to discharge of materials containing a high percentage of water or possessing thixotropic-like properties, merely causes such material to be squeezed out sideways between the screw conveyor and the table rim thereby preventing discharge over the top of the rim.

The objective of the present invention is to devise apparatus to overcome the foregoing difficulties encountered in discharging such solid or semi-solid filtered materials from horizontal table filters. Other objects and advantages will appear hereinafter.

Essentially, my novel device for removing solid or semi-solid material from a body or layer of the same lying on a horizontal bed or table comprises a plow having an inclined deck and a cutting edge at the bottom. The plow and bed are adapted to be moved horizontally relative to one another, whereupon the cutting edge contacts and penetrates said body of material. Rake means are provided which have a reciprocal motion in the direction of the incline of the deck and are thereby adapted to push portions of the material (which have been disengaged by the cutting edge) up the deck. A suitable trough and screw conveyor may be supplied adjacent to the top of the deck to receive the material therefrom and to remove the material to any desired point. The apparatus may be best understood from a consideration of the following description taken in connection with the accompanying drawings.

Figure 1 is a partial plan view of the table filter and discharge apparatus, with part of the filter table covering broken away to show the table construction.

Figure 2 is a vertical section taken along plane 2—2 of Figure 1 showing in greater detail the construction and the mode of operation of the discharge device.

Figure 3 is an elevation and partial section taken along plane 3—3 of Figure 1 illustrating with greater clarity certain features of the discharge device.

Referring particularly to Fig. 1, reference number 1 indicates generally a horizontal table filter rotatable counterclockwise about central vertical axis 2. Horizontal plate 3 is covered with filter paper 6 or other suitable filtering membrane. Holes 7 are provided in plate 3 for drawing off liquid filtrate from the slurry undergoing filtration. The body or layer 8 of solid material being filtered collects on the top of filter paper 6, as best seen in Fig. 2. Upstanding rim 11 prevents spillage of slurry and/or filtered solids from the circumferential edge of plate 3. Suitable means, not shown, are provided to cause rotation of table filter 1 about vertical axis 2.

The plow for removal of solids from the body of solids collecting on plate 6 is indicated generally at 12 on Fig. 2, and is pivotally supported at 12' at the edge of a trough. Cutting edge (e. g. doctor knife) 13 is disposed at the bottom edge of inclined deck 16 and may be secured thereto by any suitable means. Trough 17, approximately horizontal, is positioned substantially parallel with respect to the top edge of deck 16, and preferably, though not necessarily completely, above the top edge of rim 11. Screw conveyor 18 is disposed in trough 17 for conveying solids through the trough and out discharge opening 21 into suitable receptacle not shown. Screw conveyor 18 is driven by motor, sprockets and chain drive indicated at the right of Fig. 3 generally by reference number 22. Guide plates 23 and 26 fastened at their bottom edge to the opposite sides of inclined deck 16, prevent overflow of solids from the sides of said deck and also help support the deck. Threaded rods 27 and 28 are pivotally attached to plates 23 and 26, respectively, at 31 and 32. Supporting rods 27 and 28 extend through holes 33 and 36, (slotted to provide for some lateral movement of the bolts), in the flat portion of angle irons 37 and 38. By suitable adjustment of nuts 41, as will be apparent from inspection of Figs. 2 and 3, the distance between cutting edge 13 and filter table 3 may be adjusted and the depth of the bite of the cutting edge into the body 8 of material being filtered, thereby regulated.

Crank 43 is keyed to and rotates with axle 45 about axis 46, said axis being disposed generally longitudinally with respect to cutting edge 13. It will be noted that axis 46 is disposed with respect to plow 12 on the side opposite that of cutting edge 13. Connecting rod 47 is fastened at one end to rake 42, the other end being pivotally eccentrically fastened to crank 43 at 48, thereby providing a stroke of rake 42 toward crank 43 and an oppositely directed return stroke. Fulcrum 51, preferably adapted to roll freely about its own axis 52, as indicated in Fig. 2, is disposed between rake 42 and crank 43. Axis 52 is preferably disposed generally parallel with respect to cutting edge 13 and axis 46 of crank 43. Fulcrum 51 and axis 46 are preferably fixed with respect to plow 12 in its operating position although some relative movement between said parts may be permitted while realizing certain objects desired to be obtained. Crank 43 is driven through screw conveyor 18, sprockets and chain-drive indicated generally by 53, and axle 45.

As indicated above, rotation of crank 43 is counter-clockwise as viewed in Fig. 2. Starting with rake 42 and connecting rod 47 shown in the position indicated by the solid lines in Fig. 2, on the inward stroke rake 42 will be dragged up inclined deck 16 until it reaches approximately a position indicated at 42B. During this motion, connecting rod 47 is out of contact with fulcrum 51. Solid matter 56 from body of material being filtered 8, is pushed up inclined deck in front of rake 42 and discharged into trough 17. It is noted that the radial distance between axes 46 and 48 is long enough so that during the up-stroke of rake 42 over deck 16, rod 47 remains out of contact with fulcrum 51, thus permitting the lower edge of rake 42 to maintain contact with the surface of deck 12. As rotation of crank 43 continues, connecting rod 47 comes in contact with fulcrum 51, and pivots thereon, whereby rake 42 is lifted off deck 16. On the return stroke, connecting rod 47 moves in contact with fulcrum 51, preferably rolling thereon, until position 47A of rod 47 and position 42A of rake 42, indicated in phantom on Fig. 2, are reached. During this portion of the traverse, the bottom tip of rake 42 follows a path indicated by the broken line 59 in Fig. 2. The pivoting action of rod 47 on fulcrum 51 continues, thereby causing rake 42 to descend and contact inclined deck 16, engaging further material from the body 8 collected by knife 13, and beginning a new cycle of operation.

A characteristic of the path traced by rake 42 important in obtaining preferred objects of the invention is that the bottom edge of rake 42 is close to deck 16 during the inward stroke and substantially removed from the deck during the return stroke. A particular advantage of my invention is that the lever action of connecting rod 47 bearing on fulcrum 51 enables lifting of rake 42 above deck 16 ample distance to clear any accumulation of material on deck 16. Pushing material down the incline of deck 16 on the return stroke is thereby avoided and mechanical working of the material being removed is minimized. As suggested above, it is seen that fixed positioning of crank axle 46 and fulcrum axis 52 with respect to plow 12 is not essential so long as the relative movement of the rake with respect to deck 16 is as described.

Operation of the filter discharge apparatus is as follows. Table filter 1 rotates in a counter-clockwise direction as viewed in Fig. 1. The slurry, i. e. solid-liquid mixture to be filtered, is introduced onto the table filter 1 through feed pipe 57. As filter 1 rotates and carries the feed away from feed pipe 57, liquids are drawn off through filter paper 6 and holes 7 in plate 3 therebelow. Solids remain in the form of a cake or body on top of the filter paper 6. By the time the solid material has reached point 58, substantially all the free water normally has been separated and the body being filtered is in a solid or semi-solid condition depending upon characteristics of the material. When the dewatered charge reaches point 61, it is scraped up by doctor knife 13 onto inclined deck 16. Thereafter rake 42 descends, scrapes up accumulation at the lower edge of inclined deck 16 and pushes the material up inclined deck and into trough 17 as previously described. Screw conveyor 19 then forces the product through trough 17 to discharge port 21 from which the material drops into suitable receiving apparatus not shown. Hence, it is seen that the apparatus of my invention accomplishes a preferred objective, i. e. lifting of filtered solids over the external upstanding rim of the horizontal table filter by means of apparatus which minimizes mechanical working of the material, and effects removal thereof even if the material after filtration tends to be relatively free flowing.

Although specific apparatus has been described above and in the drawings, certain modifications and equivalents within the scope of the invention will be apparent to skilled mechanics. For example, instead of providing a stationary plow and moving table, the reverse may be true, i. e. the plow may move and the filter may remain stationary, or both may move, but at different speeds. The discharge apparatus may be used to lift solid or semi-solid material from surfaces other than filters. Further, trough 17 has been illustrated as preferably being disposed entirely above the top edge of rim 11. In other modifications, trough 17 may be mounted in part below the top edge of said rim, and inclined at a slope adequate to carry material thereover.

I claim:

1. Apparatus for removing and lifting solid material from a relatively flat horizontal filter bed comprising, in combination, a horizontal filter bed adapted to receive a layer of solid material thereon, a plow having an inclined deck extending vertically above the bed and a cutting edge at the bottom of the deck adapted to contact and penetrate said material, said bed and said plow being relatively horizontally movable with respect to each other, a rake mechanism comprising a rake movable slidably in an upward direction along the inclined upper surface of the deck of the plow thereby elevating the material deposited thereon, a connecting rod fastened at one end to said rake with the other end of the rod pivotally eccentrically attached to a crank rotatable about an axis disposed generally parallel with respect to said cutting edge and at an elevation above said plow, and a fulcrum disposed between said rake and said crank adapted to support the connecting rod only during a portion of the cycle of movement of the rake, said crank, fulcrum, rod, rake and deck being so disposed in relation to each other so as to cause said rod during the upward movement of the rake along the inclined deck to be out of contact with the fulcrum with one end of the rod pivotally connected to the crank and the other end of the rod attached to the rake causing the rake to scrape along the inclined surface of the deck due to the weight of the unsupported rod and rake, and to cause said rod during the downward movement of the rake to be in contact with the fulcrum causing the rod supported at one end by the crank and at an intermediate point by the fulcrum to be at an elevation sufficiently high to maintain the rake above the inclined deck of the plow.

2. Apparatus for removing and lifting solid material from a relatively flat horizontal filter bed comprising, in combination, a horizontal circular filter bed rotatable about its vertical axis adapted to receive a layer of solid material, a stationary plow having an inclined deck extending vertically above the bed and a doctor knife at the bottom of the deck adapted to contact and penetrate said material, a substantially horizontal trough associated parallel with the top edge of said deck for receiving material from said filter bed, a rake mechanism comprising a rake movable slidably in an upward direction along the inclined upper surface of the deck of the plow thereby elevating the material thereon and depositing it in the horizontal trough, a connecting rod fastened at one end to said rake with the other end of the rake pivotally, eccentrically attached to a crank rotatable about an axis disposed generally parallel with respect to said doctor knife and at an elevation above said plow, and a roller fulcrum disposed between said rake and said crank adapted to support the connecting rod only during a portion of the cycle of movement of the rake, said crank, fulcrum, rod, rake and deck being so disposed in relation to each other so as to cause said rod during the upward movement of the rake along the inclined deck to be out of contact with the fulcrum with one end of the rod pivotally connected to the crank and the other end of the rod attached to the rake causing the rake to scrape along the inclined surface of the deck due to the weight of the unsupported rod and rake, and to cause said rod during the downward movement of the rake to be in movable contact with the roller fulcrum causing the rod supported at one end by the crank and at an intermediate point by the fulcrum to be at an elevation sufficiently high to maintain the rake above the inclined deck of the plow.

JOHN A. MASLIN.

REFERENCES CITED

The following references are of record in the file of this patent:

UNITED STATES PATENTS

| Number | Name | Date |
|---|---|---|
| 849,379 | Dorr | Apr. 9, 1907 |
| 1,067,365 | Nevill | July 15, 1913 |
| 1,236,919 | Emshwiller | Aug. 14, 1917 |
| 1,335,695 | Oliver | Mar. 30, 1920 |
| 1,595,583 | Stokes | Aug. 10, 1926 |
| 2,042,308 | Hardy | May 26, 1936 |